(12) United States Patent
Crover

(10) Patent No.: US 7,059,947 B2
(45) Date of Patent: Jun. 13, 2006

(54) PORTABLE RAIL CUTTING APPARATUS

(75) Inventor: Stephen E. Crover, Boring, OR (US)

(73) Assignee: The Stanley Works, New Britain, CT (US)

( * ) Notice: Subject to any disclaimer, the term of this patent is extended or adjusted under 35 U.S.C. 154(b) by 8 days.

(21) Appl. No.: 10/843,390

(22) Filed: May 12, 2004

(65) Prior Publication Data

US 2005/0255800 A1    Nov. 17, 2005

(51) Int. Cl.
    *B24B 21/00*   (2006.01)
(52) U.S. Cl. ...................................... 451/311; 451/358
(58) Field of Classification Search ................ 451/311, 451/347, 358; 474/101, 113–118
    See application file for complete search history.

(56) References Cited

U.S. PATENT DOCUMENTS

| | | | |
|---|---|---|---|
| 2,741,282 A | 4/1956 | Wieting | |
| 3,046,707 A | 7/1962 | Obear | |
| 3,205,623 A | 9/1965 | Clayborne et al. | |
| 3,662,796 A | 5/1972 | Batistelli | |
| 4,060,940 A | 12/1977 | DeWitt, deceased | |
| 4,114,473 A | 9/1978 | Pollak | |
| 4,156,991 A | 6/1979 | McIlrath | |
| 4,620,367 A * | 11/1986 | Tubesing et al. | ............. 30/122 |
| 4,765,098 A | 8/1988 | Duff et al. | |
| 4,809,438 A * | 3/1989 | Nagashima et al. | .......... 30/390 |
| 4,848,001 A | 7/1989 | Clark et al. | |
| 4,905,424 A | 3/1990 | Nagashima et al. | |
| 4,909,114 A | 3/1990 | Astle | |
| 4,924,635 A | 5/1990 | Rudolf et al. | |
| 4,977,708 A * | 12/1990 | Kloft | ......................... 451/359 |
| 5,140,754 A | 8/1992 | Martenson | |
| 5,177,871 A * | 1/1993 | Martenson | .................... 30/122 |
| 5,486,136 A | 1/1996 | Noda | |
| 5,545,079 A | 8/1996 | Larsson et al. | |
| 5,623,999 A | 4/1997 | Linsbauer et al. | |
| 5,699,705 A | 12/1997 | Sibbet | |
| 5,752,892 A * | 5/1998 | Taomo et al. | ............... 474/112 |
| 5,766,062 A | 6/1998 | Edling | |

(Continued)

FOREIGN PATENT DOCUMENTS

DE          1 963 942        7/1970

(Continued)

OTHER PUBLICATIONS

Patent Abstracts of Japan, vol. 1999, No. 10, Aug. 31, 1999 & JP 11 138339 A (Komatsu Zenoah Co.) May 25, 1999.

*Primary Examiner*—Dung Van Nguyen
(74) *Attorney, Agent, or Firm*—Pillsbury Winthrop Shaw Pittman LLP

(57) ABSTRACT

A portable rail cutting apparatus is presented herein. The portable rail cutting apparatus comprises a housing encasing a motor, the motor configured to drive a rotary abrasive blade, a drive pulley coupled to the motor, a driven pulley coupled to the rotary abrasive blade, a loop drive belt engaged by the drive pulley at one end and engaging the driven pulley at another end, and an automatic belt tensioning mechanism. The automatic belt tensioning system comprises a spring and push rod assembly that applies a pre-set tension to the loop drive belt. The portable rail cutting apparatus may also comprise an adjustable protective guard member that partially surrounds the rotary abrasive blade and includes a detent mechanism configured to provide integral travel positions for the adjustable protective guard member.

9 Claims, 3 Drawing Sheets

U.S. PATENT DOCUMENTS

| | | |
|---|---|---|
| 5,842,637 A | 12/1998 | Lanzer |
| 6,234,889 B1 | 5/2001 | Huboud Peron |
| 6,318,353 B1 | 11/2001 | Edwards et al. |
| 6,375,557 B1 | 4/2002 | Spangenberg et al. |
| 6,378,219 B1 | 4/2002 | Hatlee |
| 6,634,480 B1 | 10/2003 | Peter et al. |
| 2003/0101857 A1 | 6/2003 | Chuang |
| 2003/0115999 A1 | 6/2003 | Woodham |
| 2004/0033852 A1* | 2/2004 | Taomo et al. ............... 474/101 |

FOREIGN PATENT DOCUMENTS

| | | |
|---|---|---|
| DE | 40 23 101 A1 | 1/1992 |
| DE | 44 23 889 C1 | 6/1995 |
| DE | 199 14 855 A1 | 10/2000 |
| DE | 199 46 364 A1 | 3/2001 |
| DE | 201 06 857 U1 | 7/2001 |
| EP | 0 340 467 A2 | 11/1989 |
| EP | 0950482 A2 | 10/1999 |
| EP | 1 098 037 A2 | 5/2001 |
| GB | 1 464 819 | 2/1977 |
| GB | 2 346 580 A | 8/2000 |
| JP | 63-105862 | 5/1988 |
| JP | 9-11032 | 1/1997 |
| JP | 9-201770 | 8/1997 |
| JP | 9-256306 | 9/1997 |
| JP | 11-138333 | 5/1999 |
| JP | 2002-1613 | 1/2002 |
| JP | 2002-96218 | 4/2002 |
| RU | 810871 | 3/1988 |
| WO | WO 02/34487 A1 | 5/2002 |

\* cited by examiner

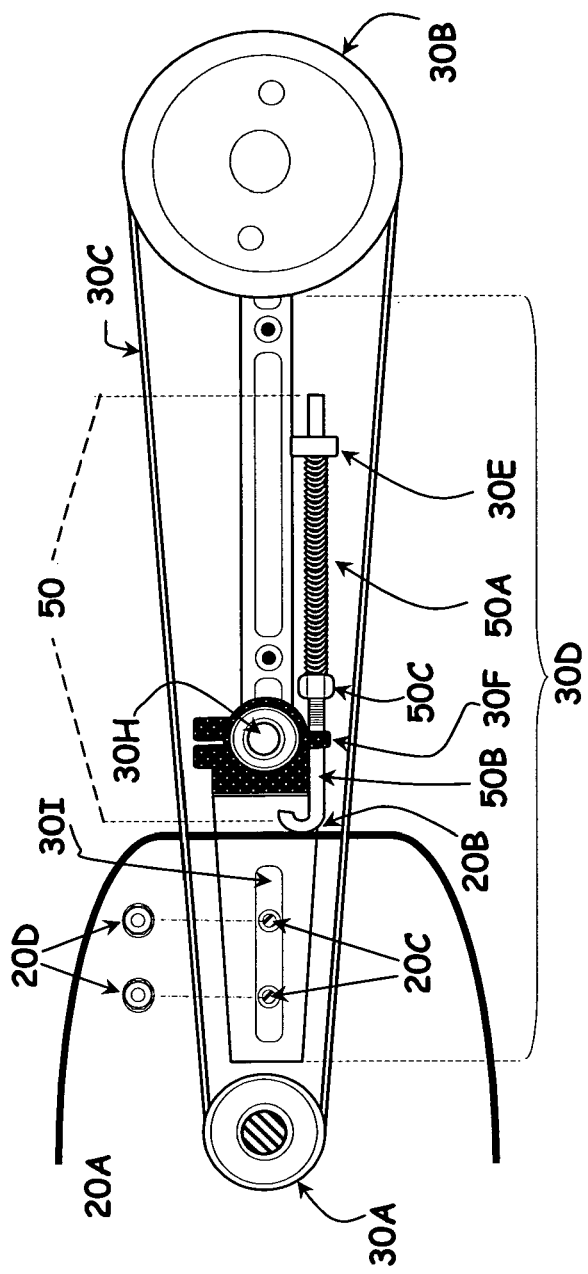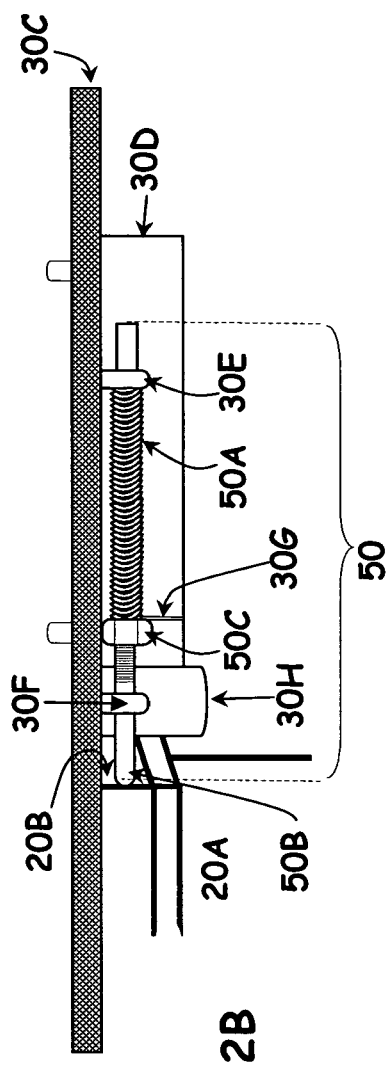
FIG. 2A
FIG. 2B

PORTABLE RAIL CUTTING APPARATUS

BACKGROUND OF THE INVENTION

1. Field of the Invention

The present invention relates to a portable, rail cutting apparatus.

2. Description of the Related Art

During the laying of railroad tracks or the joining of railroad track sections, rails may often need to be cut to specified lengths. Moreover, during railroad repairs, worn or damaged track sections may need to be cut out and replaced with new rails. These rails or track sections are generally cut by a powered rail cutting saw.

Typically, rail cutting saws employ a rotating cutting blade, such as, an abrasive rotary disk, which is applied directly to the rail to effect the desired cut. The rail cutting saw is powered by a motor, such as, for example, an internal combustion engine, which drives the cutting blade via a drive assembly.

To provide support and stability, as well as effectively guide the saw over the intended cutting area, rail cutting saws may also be configured to cooperate with a rail-mounted guide assembly. Generally, rail-mounted guide assemblies are arranged with a saw support portion and a rail mount portion. On the saw support portion, the assembly attaches to the body of the rail saw proximately along the center line between the drive pulley and the driven pulley. On the rail mount portion of the guide assembly, the assembly either clamps, joins, or otherwise secures the rail saw to the rails.

The drive assembly that drives the cutting blade, typically comprises a loop drive belt arrangement having one end of the belt coupled to a drive pulley, engaged by an output shaft of the motor. The other end of the belt is coupled to a driven pulley that engages the cutting blade. Generally, the driven pulley is coupled to the motor housing via a sliding support arm arrangement. The sliding support arm arrangement overlaps the fixed motor housing and, when the portions are not fastened together, the sliding portion is arranged to laterally slide relative to the fixed motor housing.

The sliding portion of the support arm arrangement supports the driven pulley while the fixed portion is the motor housing. The two portions are kept in place and prevented from sliding by fasteners that secure the two portions to each other. Upon loosening or removing the fasteners, the sliding portion is capable of laterally sliding in towards the motor housing or sliding out towards the driven pulley.

After a period of normal use, the loop drive belt may become loose. As such, rail saws may also be equipped with a manual belt tensioning system that enables the user to manually adjust the tension on the loop drive belt. Some belt tensioning systems comprise a tensioning screw that is positioned close to the center line between the drive and driven pulleys. In this belt tensioning system, the sliding support arm fasteners are first loosened or removed so that, as the tensioning screw is manually tightened, the sliding support arm arrangement slides or laterally extends out to increase the lateral distance between the drive pulley and the driven pulley. The increased distance serves to tighten the loop drive belt.

Other belt tensioning systems comprise a cam adjustment device, in which a cam structure and a post structure are positioned on the sliding support arm arrangement. With the sliding support arm fasteners loosened or removed, the cam portion is rotated to impart a tensioning force on the post structure that serves to slide or laterally extend the sliding support arm arrangement to increase the lateral distance between the drive pulley and the driven pulley, and thus, tighten the loop drive belt.

Rail cutting saws may also be equipped with an adjustable protective blade guard to reduce the risk of injury from flying debris and/or blade malfunction. In some instances, the blade guard may be kept in place by fasteners that require the use of tools to effect guard positional adjustments. That is, to adjust the guard position, the fasteners are manually loosened with the tool, the guard is rotated or pivoted into its new position, and then the fasteners are manually retightened with the tool to secure the guard in its new position.

In other instances, the blade guard may held in place by friction surfaces, thereby avoiding the use of tools to adjust the guard position. In this tool-less configuration, the friction surfaces are disposed at or near the pivot center of the blade guard and the blade guard position is adjusted by pushing or pulling a guard handle secured to the circumference of the blade guard. Attaching the handle to the circumference of the blade guard provides the mechanical advantage of facilitating the necessary torque to overcome the holding strength of the friction surfaces.

SUMMARY OF THE INVENTION

As noted above, some rail saws may be equipped with a manual belt tensioning system that enables the user to manually adjust the tension on the loop drive belt. However, such belt tensioning systems rely on operator intuition to estimate the required adjustments. Such estimations often lead to under-tightening, which results in belt slippage, or over-tightening, which results in premature wear.

For at least these reasons, the principles of the present invention, as embodied and broadly described herein, provide a portable rail cutting apparatus having an automatic belt tensioning system that applies a pre-set tension to the loop drive belt and, thus, avoids reliance on operator estimation. In one embodiment, the portable rail cutting apparatus comprises a housing encasing a motor, the motor configured to drive a rotary abrasive blade, a drive pulley coupled to the motor, a driven pulley coupled to the rotary abrasive blade, a loop drive belt engaged by the drive pulley at one end and engaging the driven pulley at another end, and an automatic belt tensioning mechanism. The automatic belt tensioning system comprises a spring and push rod assembly that applies a pre-set tension to the loop drive belt.

As noted above, some rail saws may be equipped with tool-less adjustable protected blade guards that employ friction surfaces positioned near the pivot center of the guard. However, because the friction surfaces are located near the pivot center, there is a greater likelihood of blade guard malfunction during cutting wheel failures.

Accordingly, the present invention further provides a portable rail cutting apparatus having an adjustable protective blade guard with a tool-less detent mechanism that locks the blade guard in place and avoids malfunctions caused by cutting wheel failures. In one embodiment, the portable rail cutting apparatus, comprises a housing encasing a motor, the motor configured to drive a rotary abrasive blade, a drive pulley coupled to the motor, a driven pulley coupled to the rotary abrasive blade, and an adjustable protective guard member that partially surrounds the rotary abrasive blade and includes a detent mechanism configured to provide integral travel positions for the adjustable protective guard member.

The detent mechanism is disposed proximate to a periphery of the adjustable protective guard member and includes a slot having a series of apertures defining the integral travel positions and a spring-actuated knob piston. The spring-actuated knob piston engages one of the apertures to lock the adjustable protective guard member into one of the integral travel positions and depressing the spring-actuated knob piston disengages the spring-actuated knob piston enabling the adjustment of the protective guard member.

BRIEF DESCRIPTION OF DRAWINGS

The present invention will be described with reference to drawings, in which:

FIG. 2A is a side elevation view of an automatic belt tensioning system, in accordance with the present invention; and FIG. 2B is a bottom view of the automatic belt tensioning system.

DETAILED DESCRIPTION OF THE INVENTION

Figure 1A:
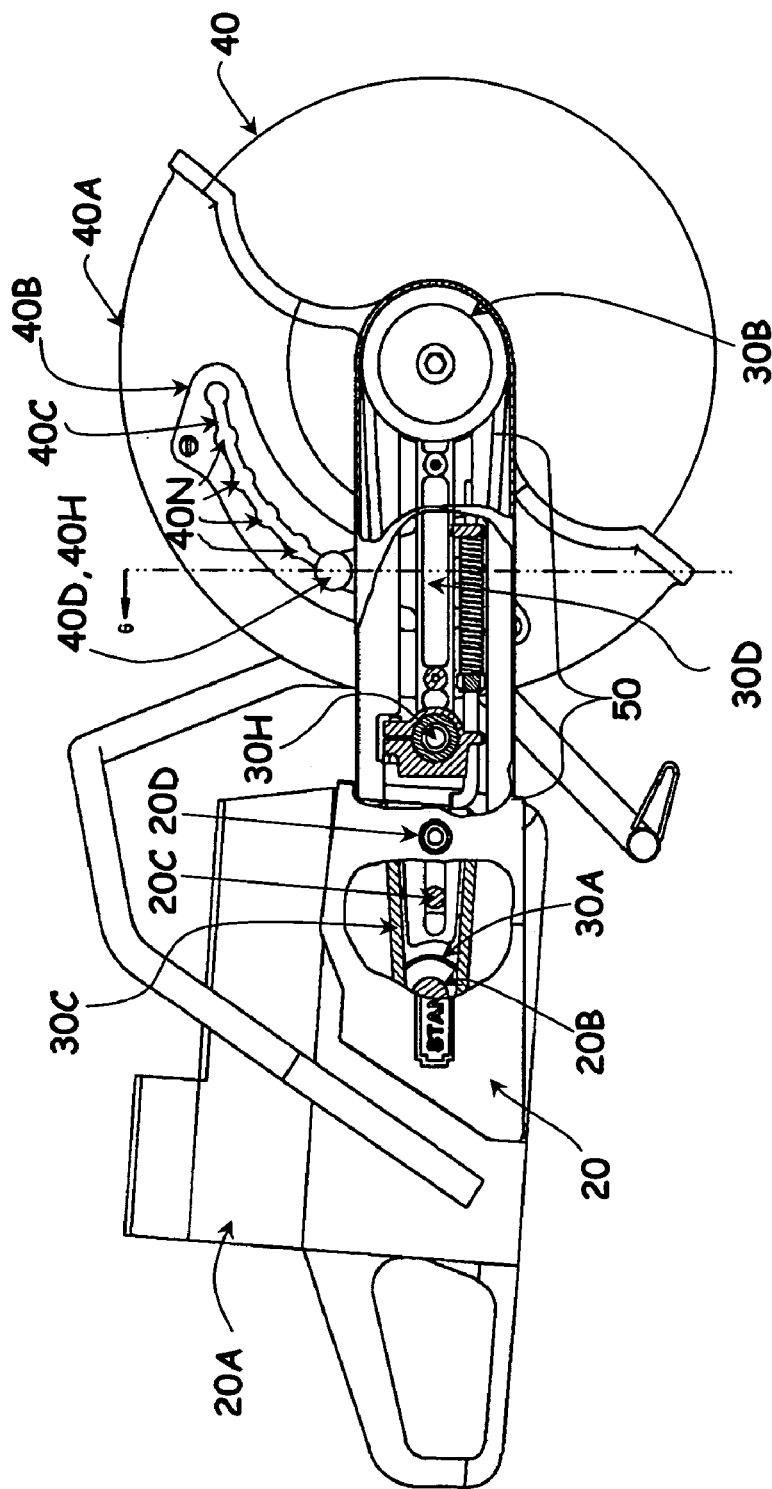
FIG. 1A is a side elevation view with cut-out portions of a portable rail cutting apparatus, in accordance with the present invention.
Figure 1B:
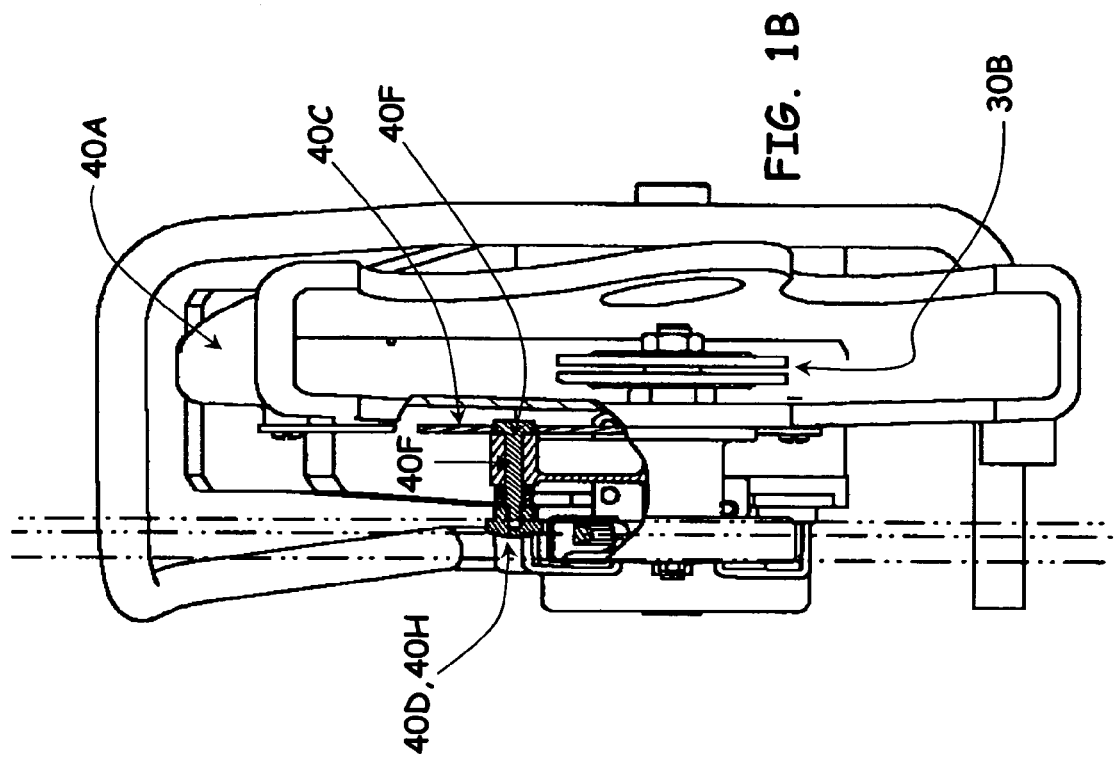
FIG. 1B is a front view of the portable rail cutting apparatus.

FIG. 1A depicts a side elevation view of a portable rail cutting apparatus 10, in accordance with the present invention. Rail cutting apparatus 10 comprises a motor 20, a drive assembly 30, a cutting blade 40, and an automatic belt tensioning system 50. Motor 20 comprises an internal combustion-type engine that is encased within a motor housing 20A. It will be appreciated that motor 20 may be also comprise an electric induction motor or any motor suitable for such purposes. Motor 20 includes an output shaft 20B, which is coupled to, and configured to drive, a drive pulley 30A.

In the embodiments described below, cutting blade 40 comprises a rotary abrasive disc or blade. It will be appreciated, however, that any suitable disc blade capable of cutting metal may be used. The rotary abrasive blade 40 is engaged by, and coupled to, a driven pulley 30B. The rotary abrasive blade 40 is partially covered by an adjustable protective guard member 40A. The rotary abrasive blade 40 and driven pulley 30B are supported by one end of a spindle mount arm 30D. As better illustrated in FIG. 2A, the other end of spindle mount arm 30D includes a slotted portion 30I that is securely attached to the body of motor housing 20A via fasteners 20D, such as bar clamp nuts or the like. Fasteners 20D are threaded onto threaded posts 20C, which are fixedly attached to the body of motor housing 20A.

To increase the lateral distance between drive pulley 30A and driven pulley 30B (to maintain tension on the drive belt, as discussed in greater detail below), spindle mount arm 30D is constructed with the capability of being able to travel a pre-specified distance along a lateral direction. Specifically, slotted portion 30I of spindle mount arm 30D is configured so that the slot spans a length that is greater than the length spanned by posts 20C, enabling spindle mount arm 30D to laterally slide out for a distance that is equivalent to the difference between the slot and post 20C lengths.

Spindle mount arm 30D also includes an attachment portal 30H, positioned proximately along the center line between drive pulley 30A and driven pulley 30B, in order to enable the coupling of a rail-mounted guide assembly to rail cutting apparatus 10.

Drive assembly 30 comprises drive pulley 30A, driven pulley 30B, and a loop drive belt 30C. Loop drive belt 30C may comprise a flexible band, chain, or any other belt suitable for such purposes. Loop drive belt 30C partially wraps around drive pulley 30A and driven pulley 30B. During operations, drive pulley 30A engages loop drive belt 30C which, in turn, engages driven pulley 30B to rotate rotary abrasive blade 40.

Belt tensioning system 50 is configured to apply a preset tension to loop drive belt 30C and to automatically impart the appropriate tension upon adjustment. In particular, belt tensioning system 50 comprises a spring 50A, push rod 50B, and tension nut 50C assembly. Because attachment portal 30H is generally positioned along the center line between drive pulley 30A and driven pulley 30B, spring 50A, push rod 50B, and tension nut 50C assembly are disposed at an off-center position between said drive pulley 30A and said driven pulley 30B.

Push rod 50B includes a threaded portion, in which tension nut 50C is threaded thereon. Push rod 50B is inserted through guiding holes of shoulder mounts 30E, 30F of spindle arm 30D as well as spring 50A. Spring 50A is interposed between tension nut 50C and shoulder mount 30E.

In one embodiment, tension nut 50C is threaded and adjusted during assembly so that it aligns with a tension line marker 30G, as depicted in FIG. 2B. Tension line marker 30G is provided on spindle mount arm 30D (e.g., on the underside of 30D in FIG. 2B) to identify a desirable position of tension nut 50C that corresponds to the desired pre-set tension. So, adjusting tension nut 50C to line marker 30F compresses spring 50A, which bears a pre-set tension force on shoulder mount 30E of spindle arm 30D. Commensurately, push rod 50B bears the pre-set tension force on a housing mount portion 20B of motor housing 20A.

The pre-set tension force on housing mount portion 20B, imparted by push rod 50B, laterally extends spindle mount arm 30D out from motor housing 20A. This spindle mount arm 30D extension translates the pre-set tension to loop drive belt 30C. In other words, the pre-set tension force laterally extends spindle mount arm 30D which, as indicated above, supports driven pulley 30B that is coupled to drive belt 30C. This results in achieving a desired lateral distance between drive pulley 30A and driven pulley 30B that corresponds to the application of the pre-set tension force on drive belt 30C. In this manner, belt tensioning system 50 applies the preset tension force to loop drive belt 30C to ensure that drive belt 30C achieves the proper tension.

The pre-set tension force on housing mount portion 20B also defines an initial locking position for spindle arm 30D during assembly. That is, upon aligning tension nut 50C with tension line marker 30G during assembly, spindle arm 30D is locked into position by securing slotted portion 30I of spindle mount arm 30D to the body of motor housing 20A by tightening fasteners 20D onto threaded posts 20C.

As discussed above, loop drive belt 30C may become loose after normal use. By virtue of its configuration, automatic belt tensioning system 50 facilitates re-tensioning adjustments by simply loosening and retightening fasteners 20D. Specifically, by loosening fasteners 20D, spindle mount arm 30D is released from the initial locked position so that the pre-set tension force of belt tensioning system 50 automatically extends spindle arm 30D further out from the body of motor housing 20A in a lateral direction. Accordingly, slotted portion 30I travels to a new lateral position (i.e., to the right in FIG. 2A). This further extension translates the pre-set tension to loop drive belt 30C, tightening drive belt 30C to eliminate any slack in loop drive belt 30C and to, once again, ensure that drive belt 30C achieves the proper tension. Retightening fasteners 20D onto threaded posts 20C after the re-tensioning adjustment, locks in slotted portion 30I to the new lateral position, thereby locking in the adjustment.

Thus, re-tensioning adjustments of the present invention do not rely on operator intuition to estimate re-tensioning adjustments, but are automatic. This results in the reduction of drive belt under-tightening, which may lead to belt slippage, and drive belt over-tightening, which may lead to in premature wear.

As illustrated in FIG. 1A and noted above, rotary abrasive blade 40 is partially surrounded by an adjustable protective guard member 40A. Guard member 40A includes a detent mechanism 40B that facilitates the tool-less positional adjustment of guard member 40A. Detent mechanism 40B is proximately positioned along the periphery of guard member 40A and comprises a guide slot 40C configured with a series of apertures 40N, spaced at predetermined locations, and a spring-actuated knob piston 40D. Apertures 40N are configured with a larger diameter than the width of slot 40C.

The combination of slot 40C and apertures 40N provide integral travel positions to which guard member 40A can be adjusted. In other words, slot 40C and apertures 40N are constructed and operative to limit the positional adjustment range of guard member 40A. The span of slot 40C, which corresponds to the positional adjustment range of guard member 40A, is configured so that guard member 40A cannot be adjusted to a position that exposes the operator.

Figure 1C:
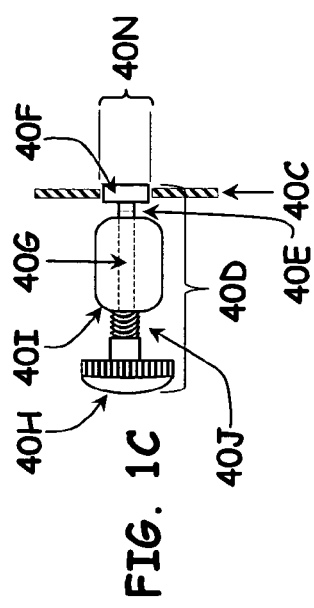
FIG. 1C depicts portions of an engaged protective guard member detent system, in accordance with the present invention.

As better illustrated in FIG. 1C, which depicts detent mechanism 40B engaged, spring-actuated knob piston 40D comprises a piston 40E a spring 40J. Piston 40E contains a head portion 40F having a larger diameter than a piston rod portion 40G. Detent mechanism 40B is configured so that, when engaged, head portion 40H fits within one of the apertures 40N, but not within guide slot 40C. This results in effectively locking in protective guard member 40A into the travel position that corresponds to the engaged aperture.

Figure 1D:
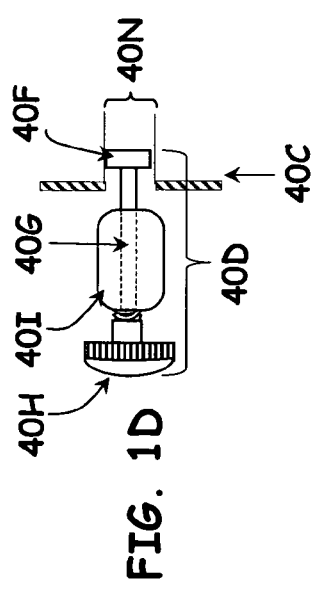
FIG. 1D depicts a disengaged protective guard member detent mechanism.

When disengaged (as illustrated by FIG. 1D), detent mechanism 40B extends piston rod portion 40G, so that portion 40G fits within guide slot 40C and protective guard member 40A can be rotated to freely travel along the extent of slot 40C.

Piston rod 40G is inserted through a guide hole (not shown) of a piston mount 40I. Piston rod 40G is attached to a knob portion 40H. Interposed between knob portion 40H and piston mount 40I is spring 40J. When detent mechanism 40B is engaged, spring 40J biases knob portion 40H outward so that piston head portion 40H remains securely disposed within one of the apertures 40N and protective guard member 40A remains locked into the travel position that corresponds to the engaged aperture.

To adjust protective guard member 40A to one of the integral travel positions defined by apertures 40N, detent mechanism 40B is disengaged by sufficiently pressing knob portion 40H to overcome the biasing force of spring 40J and extend piston head portion 40H beyond the plane of guide slot 40C. As illustrated in FIG. 1D, in so doing, piston rod portion 40G comes into communication with the plane of guide slot 40C. As noted above, rod portion 40G fits within guide slot 40C, thereby enabling protective guard member 40A to be freely rotated along the extent of guide slot 40C.

When a desired guard member 40A position is reached, knob portion 40H is released so that piston head portion 40H securely settles into the nearest aperture 40N and protective guard member 40A is locked into position.

In this manner, detent mechanism 40B enables the tool-less positional adjustments of protective blade guard member 40A. It will be appreciated that because detent mechanism 40B is situated close to the circumference of guard member 40A, it manifests a greater mechanical advantage than conventional tool-less configurations that have friction surfaces located near the guard pivot center. As such, it is also more resistant to blade guard movement during cutting blade failures.

While specific embodiments of the invention have been described above, it will be appreciated that the invention may be practiced otherwise than as described. As such, the description is not intended to limit the invention. The configuration, operation, and behavior of the present invention has been described with the understanding that modifications and variations of the embodiments are possible, given the level of detail present herein. Thus, the preceding detailed description is not meant or intended to, in any way, limit the invention—rather the scope of the invention is defined by the appended claims.

What is claimed is:

1. A portable rail cutting apparatus, comprising:
    a housing encasing a motor, said motor configured to drive a rotary abrasive blade;
    a drive pulley coupled to said motor;
    a driven pulley coupled to said rotary abrasive blade;
    a spindle mount arm having one end coupled to said driven pulley and another end with a slot that is coupled to said housing via fasteners;
    a loop drive belt engaged by said drive pulley and by said driven pulley; and
    an automatic belt tensioning mechanism containing a spring and push rod assembly to apply a pre-set tension to said loop drive belt,
    wherein automatic re-tensioning of said loop drive belt is performed by loosening and retightening said fasteners coupling said spindle mount arm to said housing.

2. The rail cutting apparatus of claim 1, wherein said spring and push rod assembly is disposed at a location off-center between said drive pulley and said driven pulley.

3. The rail cutting apparatus of claim 1, wherein said automatic belt tensioning mechanism further comprises a tensioning nut that is threaded onto said push rod to provide a tension force by compressing said spring.

4. The rail cutting apparatus of claim 3, wherein said tensioning nut is adjusted to align with a tension marker to achieve said pre-set tension.

5. The rail cutting apparatus of claim 1, further comprising posts on said housing to which fasteners couple said spindle mount arm to said housing.

6. The rail cutting apparatus of claim 5, wherein said slot has a length that is greater than a distance spanned by said housing posts in order to enable said spindle mount arm to move along a lateral direction.

7. The rail cutting apparatus of claim 6, wherein said push rod exerts said pre-set tension force on said housing to displace said spindle mount arm along the lateral direction to establish a distance between said drive and driven pulleys such that said loop drive belt is maintained at said pre-set tension.

8. The rail cutting apparatus of claim 7, wherein said spindle mount arm displacement is locked into place by securing said slot to said housing posts.

9. The rail cutting apparatus of claim 8, wherein, upon releasing said slot from said housing posts, said push rod automatically exerts said pre-set tension force to said housing to further displace said spindle mount arm along the lateral direction in order to re-tension said loop drive belt.

* * * * *